United States Patent [19]
Weichhand et al.

[11] 3,811,330
[45] May 21, 1974

[54] PACKAGING MACHINE HAVING RECIPROCATING TRANSPORT CONVEYOR

[75] Inventors: Robert J. Weichhand, Fort Wright; Ralph J. Schuler, Fort Mitchell, both of Ky.; Julian A. Dieter, Cincinnati, Ohio

[73] Assignee: R. A. Jones and Company, Incorporated, Covington, Ky.

[22] Filed: Aug. 18, 1972

[21] Appl. No.: 281,933

[52] U.S. Cl. .................................................. 74/53
[51] Int. Cl. .................................................. F16h 25/08
[58] Field of Search ........ 74/53, 128, 142, 575, 577

[56] References Cited
UNITED STATES PATENTS
| | | |
|---|---|---|
| 1,742,746 | 1/1930 | Zubaty.................................. 74/53 |
| 2,510,465 | 6/1950 | Ellis..................................... 74/53 |
| 2,868,026 | 1/1959 | Finehout et al........................ 74/577 |

Primary Examiner—Samuel Scott
Assistant Examiner—Wesley S. Ratliff, Jr.
Attorney, Agent, or Firm—Wood, Herron & Evans

[57] ABSTRACT

A packaging machine having a plurality of work stations longitudinally spaced in a line, a longitudinal reciprocating transport bar for moving packages intermittently through said work stations, a plurality of reciprocable work station elements, a plurality of leaf springs connected at one end to a support and at their other ends respectively to the transport bar and work elements, and cams on a common drive shaft cooperating with the leaf springs to swing the leaf springs back and forth to operate the work station elements and transversely reciprocate the transport bar.

3 Claims, 6 Drawing Figures

3,811,330

PACKAGING MACHINE HAVING RECIPROCATING TRANSPORT CONVEYOR

This invention relates to a packaging machine and particularly to the drive system for transporting packages through successive work stations and to drive the operating elements associated with each work station.

It has been the practice in packaging machines to provide some means for conveying packages through successive work stations and at each work station to provide operating elements which perform specified functions on the packages. Normally each work station has a system of cams, followers and linkages to impart to the operating elements the required motions to perform the successive operations on the packages. These special motion transmission systems associated with each of the work stations have been necessarily complex, expensive to manufacture and costly to maintain.

An objective of the present invention has been to provide a very simple drive system for a motion transmitting system from a main drive shaft to a transport conveyor for the packages and to the operating elements at the work stations through which the packages pass.

More particularly, the invention provides a single drive shaft located adjacent the work stations, the drive shaft being connected through cams to a plurality of leaf springs to cause the leaf springs to flex and swing backwards and forwards in a predetermined relationship to reciprocate the transport conveyor and at least some of the operating elements. The utilization of a plurality of leaf springs which are cam-driven from a single shaft greatly reduces the complexity normally required to transmit motion from a drive shaft to a plurality of different operating components.

Another objective of the invention has been to provide a simplified intermittent motion transport conveyor consisting of a transport bar having one drive to reciprocate it longitudinally and a slide element slidably carrying the transport bar with a second system for reciprocating the slide transversely toward and away from the work stations. Preferably the means for transversely reciprocating the slide element is the cam-driven leaf spring system described above.

These and other objectives of the present invention will become more readily apparent from the following detailed description taken in conjunction with the accompanying drawings in which.

Figure 1:
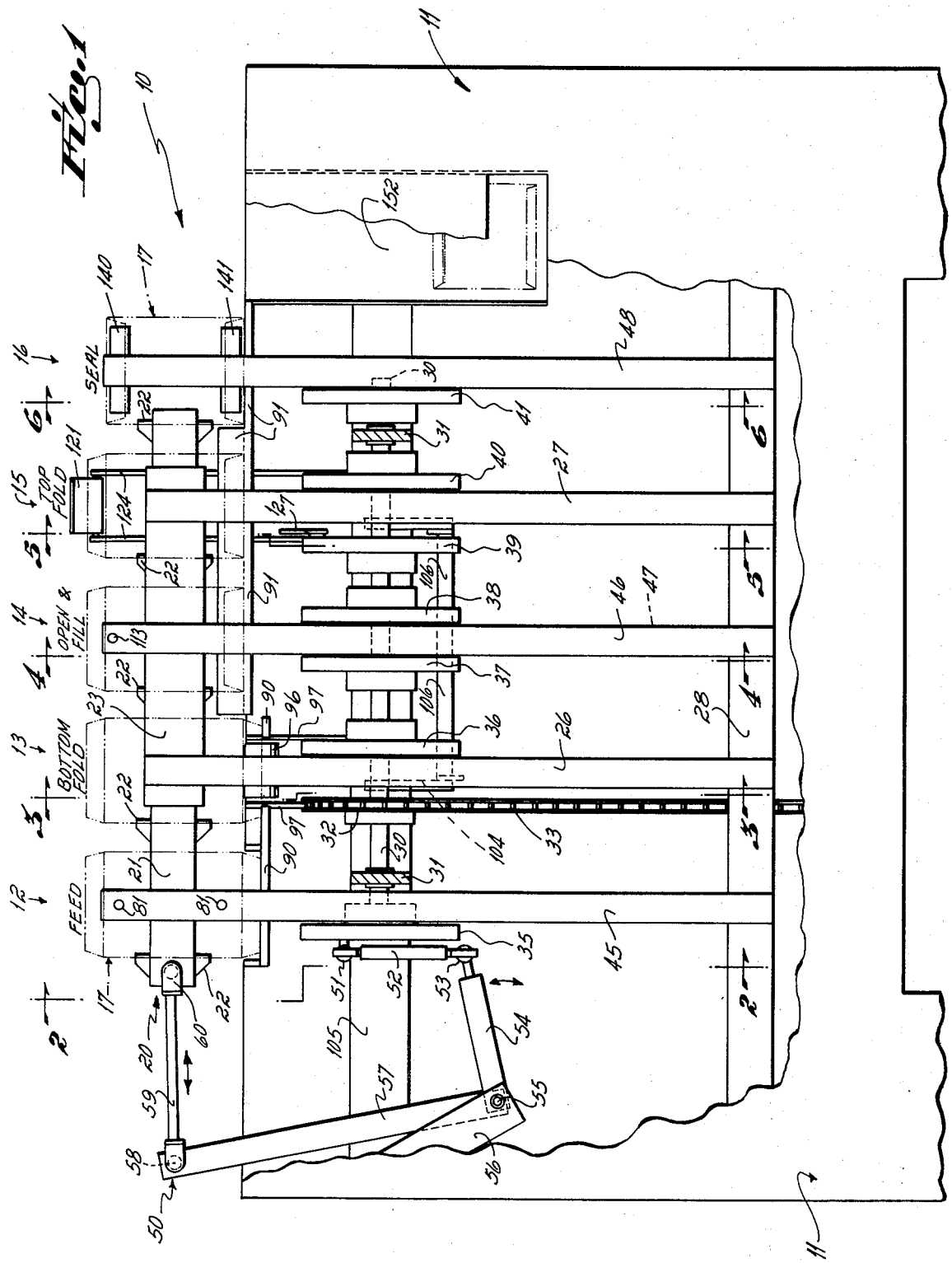
FIG. 1 is a side elevational view of the packaging apparatus.

As shown in FIG. 1, the packaging apparatus indicated at 10 is mounted on a frame 11 and has a plurality of work stations 12, 13, 14, 15 and 16 through which packages in the form of envelopes or pouches 17 pass. In the illustrated embodiment the work stations are respectively a feeding station 12, a bottom folding station 13, an opening and filling station 14, a top folding station 15 and a sealing station 16. The pouches are conveyed through the successive work stations by a transport conveyor 20 which is formed principally by a transport bar 21 carrying transport lugs 22, the transport bar being slidable in a channel-shaped slide element 23. The slide element 23 is reciprocated transversely with respect to the line of work stations, and the transport member is reciprocated longitudinally with respect to the line of work stations, thereby producing a composite, generally oval-shaped motion to the transport lugs. In this motion, as viewed in FIG. 1, the transport bar and lugs move into engagement with respective pouches, slide them toward the right the distance between adjacent work stations, swing transversely away from the pouches, slide toward the left to engage the next upstream pouches and repeat the cycle of motions. Thus, the pouches are transported intermittently through the successive work stations.

The conveyor slide member 23 is supported on the upper ends of two leaf springs 26 and 27, the lower ends of which are secured to a support 28 which is fixed in the frame 11. The transverse reciprocation of the slide element 23 is caused by the flexing and swinging back and forth of the leaf springs 26 and 27.

The single drive shaft 30 extends longitudinally adjacent the leaf springs 26 and 27 and is rotatably mounted in bearing blocks 31 at each end. The drive shaft 30 carries a fixed chain sprocket 32 over which an endless chain 33 passes, the chain 33 being driven from a motor, not shown. The drive shaft carries a plurality of cams 35, 36, 37, 38, 39, 40 and 41 through which the rotary motion of the drive shaft is transmitted to the transport conveyor and to the operating elements at the respective work stations.

In addition to leaf springs 26 and 27 which carry the transport conveyor, additional leaf springs 45, 46, 47 and 48 are mounted on the support bar 28. Each of the leaf springs is operatively connected to a respective cam, as will be described in detail below, to cause the leaf springs to swing back and forth in timed relationship to effect the operation of the transport and the operating elements at the respective work stations.

TRANSPORT BAR RECIPROCATING MECHANISM

Longitudinal reciprocation of the transport bar 21 is effected through a linkage system 50 which connects it to the cam 35. The cam 35 has a ball 51 projecting from it, the ball 51 being connected by a link 52 through a ball joint 53 to a link 54. The link 54 is pivoted at 55 to a bracket 56. The link 54 is fixed to a link 57, the links 54 and 57 constituting a bell crank lever. The end of the link 57 is connected through a ball joint 58 or other universal connection to a link 59 whose other end is connected by a ball joint 60 to the transport bar 21. Rotation of the cam 35 thus causes the longitudinal reciprocation of the transport bar 21 through the linkage system 50.

Figure 3:
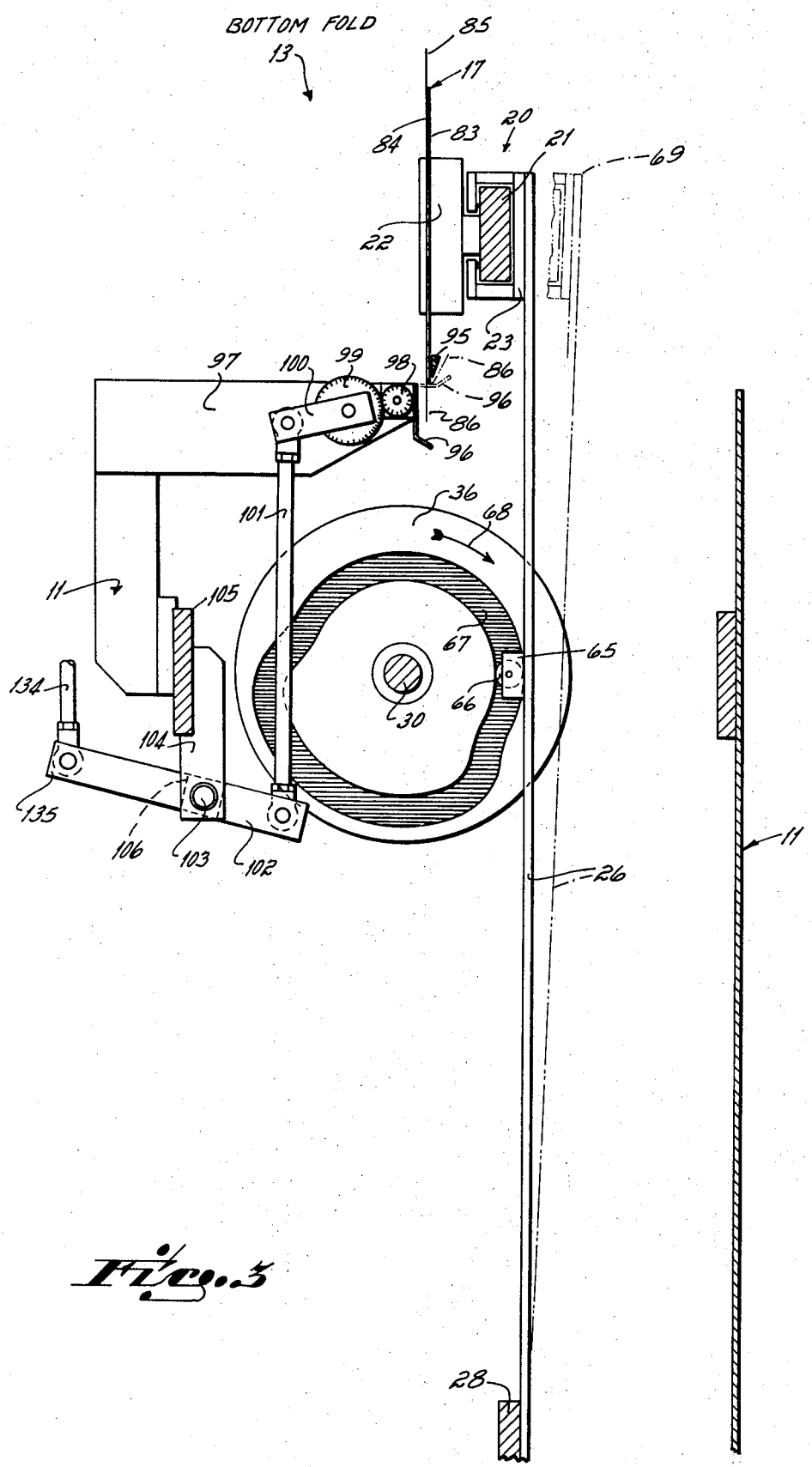
FIG. 3 is a cross-sectional view taken along lines 3—3 showing the bottom fold mechanism.

As indicated above, transverse reciprocation of the transport bar is effected through the leaf springs 26 and 27. Referring first to FIG. 3, the leaf spring 26 is shown connected at its upper end to the channel-shaped slide element 23 in which the transport bar 21 reciprocates. Between the upper and lower ends of the leaf spring 26 is a block 65 fixed to the leaf spring and carrying a roller 66 forming a cam follower, the roller 66 riding in a cam groove 67 formed in the cam 36. As can be seen from FIG. 3, rotation of the cam 36 in the direction of the arrow 68 causes the upper end of the leaf spring to swing from the solid line position to the broken line position indicated at 69. In swinging, the leaf spring simply flexes from its fixed mounting of the lower end on the support bar 28.

Figure 5:
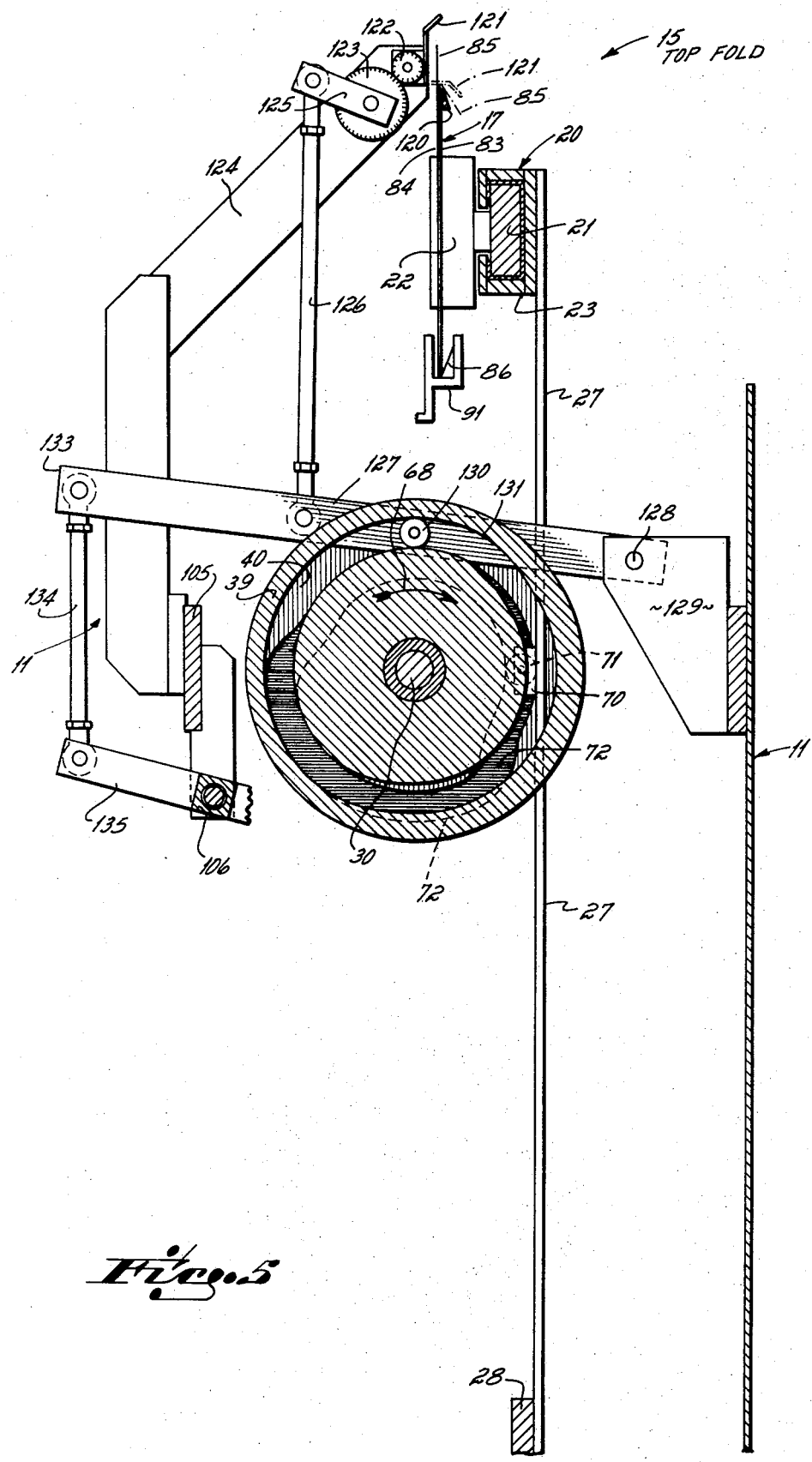
FIG. 5 is a cross-sectional view taken along lines 5—5 of FIG. 1 showing the top fold mechanism.
Figure 6:
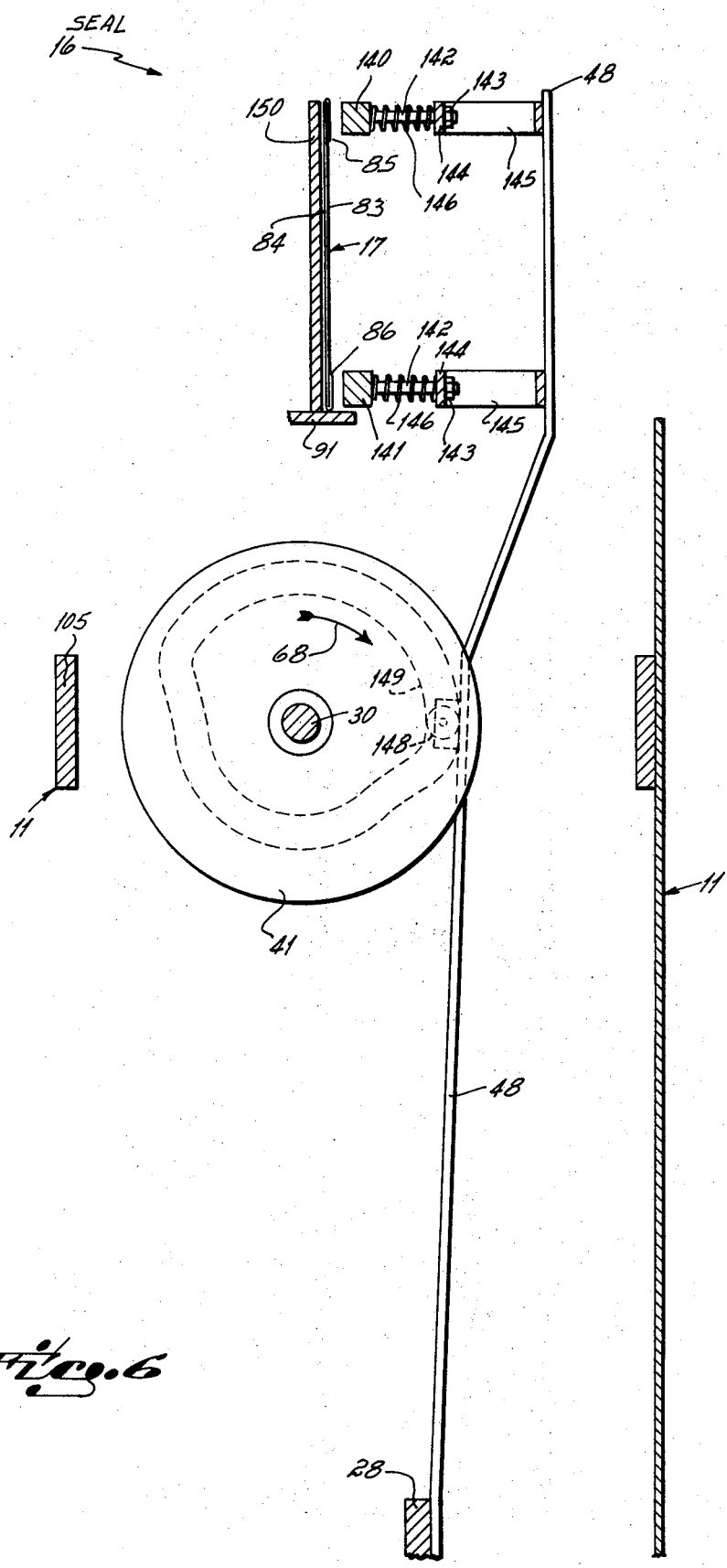
FIG. 6 is a cross-sectional view taken along lines 6—6 of FIG. 1 showing the sealing mechanism.

The other leaf spring 27 is similarly operated as illustrated in FIG. 5. The leaf spring 27 carries a block 70 to which is mounted a cam follower roller 71, the cam follower roller being located in a cam groove 72 in cam 40 which is hidden from view by the cam 39. The groove 72 in the cam 40 is identical to that of the groove 67 in cam 36 so that the two leaf springs 26 and 27 have identical motions as the cams rotate.

POUCH FEEDING MECHANISM

Figure 2:
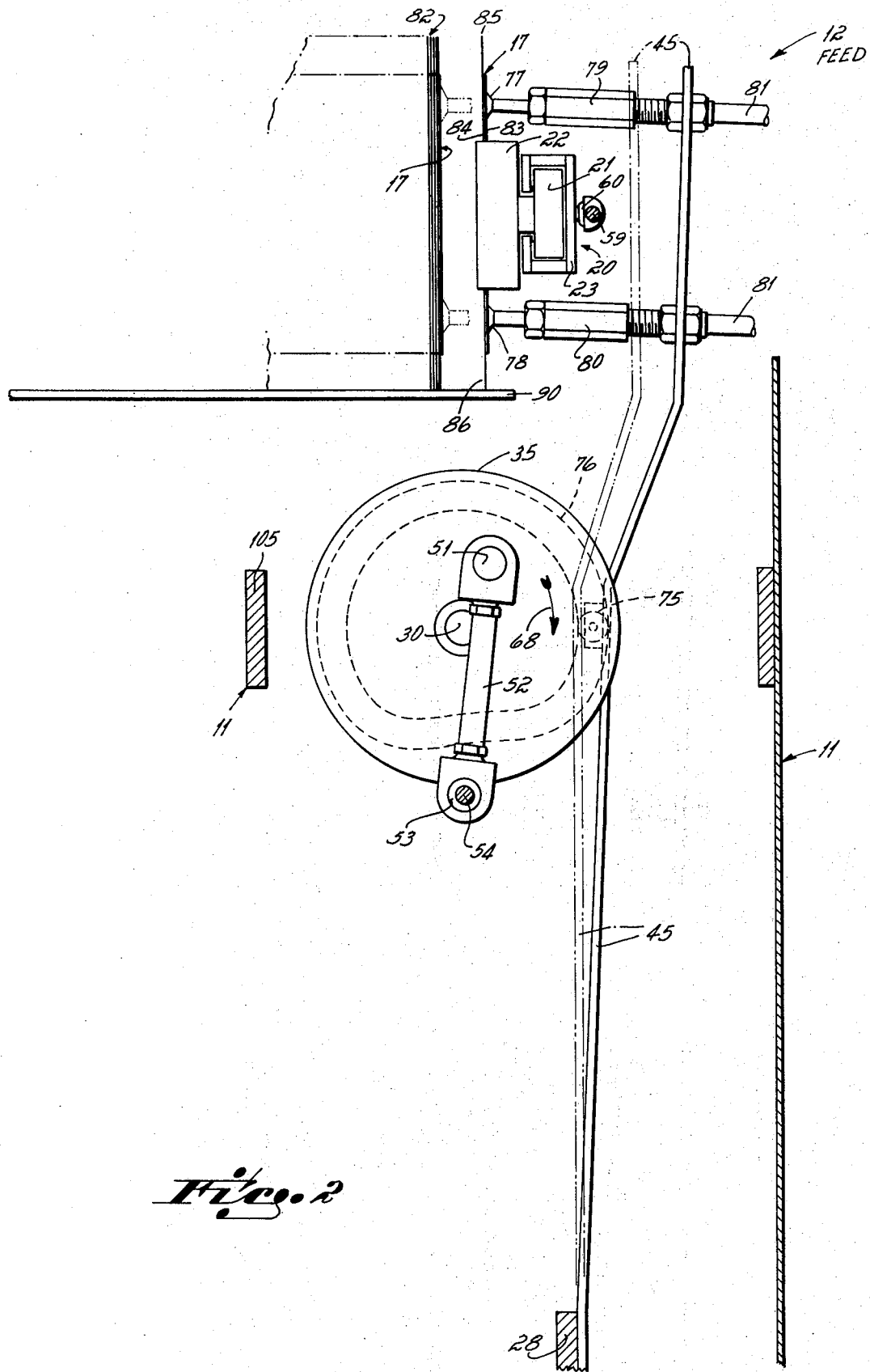
FIG. 2 is a cross-sectional view taken along lines 2—2 of FIG. 1 showing the blank feed mechanism.

The pouch feeding mechanism is illustrated in FIG. 2. It includes the leaf spring 45 which carries a cam follower roller 75 riding in a groove 76 in the cam 35. At the upper end of the leaf spring 45 are upper and lower suction cups 77 and 78 which are connected by couplings 79 and 80 to flexible hoses 81. The flexible hoses are connected through a valve system, not shown, to a source of vacuum which is intermittently applied through the valve system to the suction cups. As the rotation of the cam 35 causes the leaf spring to swing backwards and forwards, the suction cups move into engagement with a supply 82 of pouches in a magazine, the suction cup pulling the pouches off one at a time to pull them into the path of the lugs 22 on the transport bar 21.

As can be seen from FIG. 2, each pouch has a front wall 83, a back wall 84, an upper flap 85 connected to the back wall and a lower flap 86 connected to the back wall.

Figure 4:
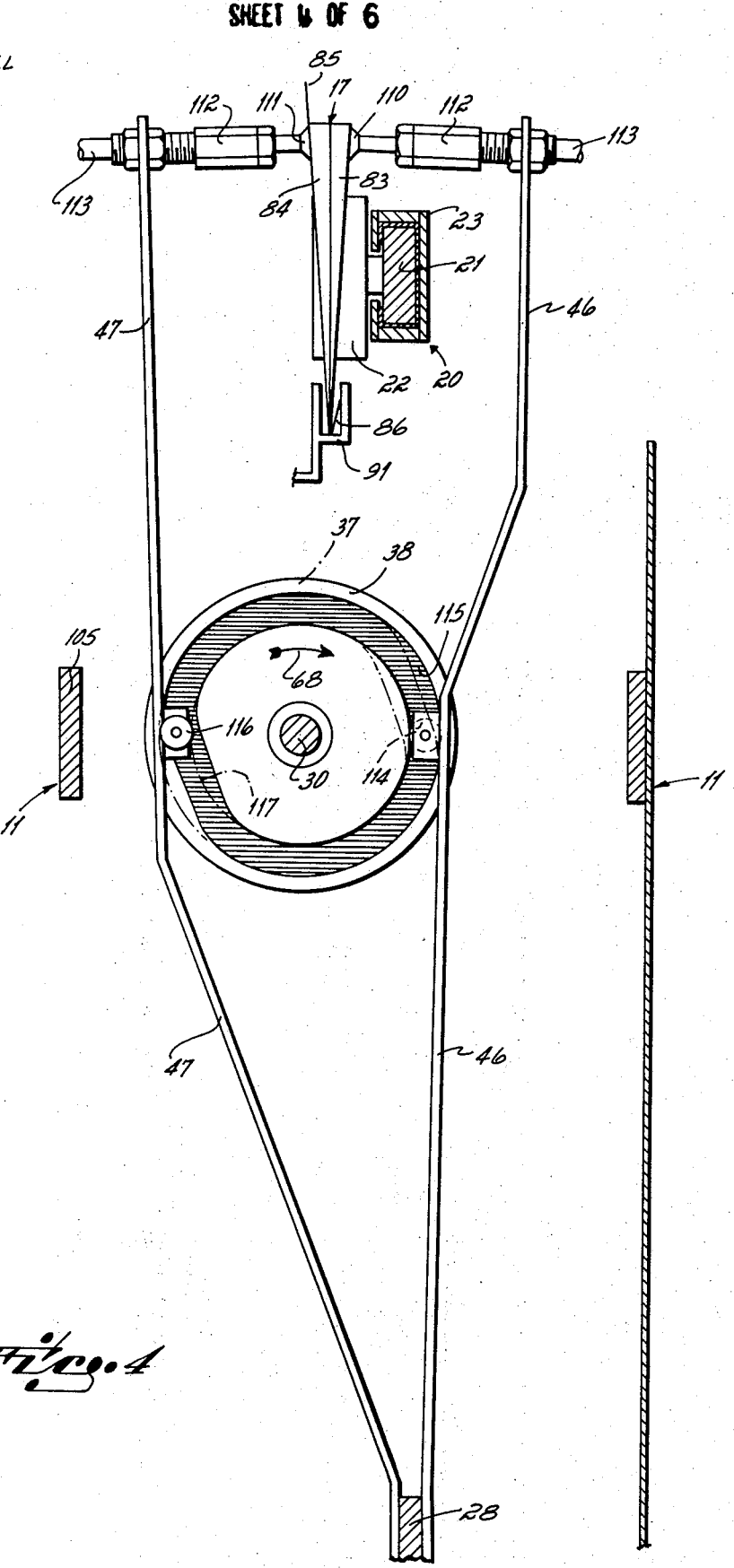
FIG. 4 is a cross-sectional view taken along lines 4—4 showing the opening mechanism to permit the filling of the package.

The pouches are initially supported on a plate 90 which is a forwardly projecting extension of the magazine by which the pouches are supported. The plate 90 extends from the feeding station 12 to a bottom fold station 13, as shown in FIG. 1. Thereafter, when the bottom is folded the pouches are supported by a channel 91, as shown in FIGS. 1, 4 and 5, through the opening and filling station 14, the top folding station 15 and the sealing station 16.

MECHANISM FOR FOLDING THE BOTTOM FLAP

The mechanism for folding the bottom flap is illustrated in FIG. 3. The bottom flap 86 is folded about a blade 95 by an oscillating folder 96 which is rotatably mounted on a bracket 97. The folder 96 carries a gear 98 which meshes with a larger gear 99 also rotatably mounted on the bracket 97. An arm 100 is fixed to the gear 99 and is connected to one end over a link 101, the other end of the link 101 being connected to a rocker bar 102. The rocker 102 is pivoted at 103 to a bracket 104, the bracket 104 being mounted on an element 105 of the frame 11, as is the bracket 97. The bar 102 is oscillated by a shaft 106 (see also FIGS. 1 and 5) which is in turn caused to oscillate by the cam 39 which will be described in detail below in connection with the top folding station 15.

Oscillation of the shaft 106 causes, through the bar 102, link 101 and arm 100 the oscillation of the large gear 99. The motion of the large gear 99 is transmitted through the gear 98 to the folder 96. The folder 96 swings from the solid line position upwardly to the broken line position, during which it engages the bottom flap 86 and swings it up to the broken line position illustrated in FIG. 3.

After the bottom flap 86 is folded, the pouch is moved by the transport conveyor to the opening and filling station 14 where the upwardly folded bottom flap is held in the upwardly folded position by the channel support 91 in which it rides.

MECHANISM FOR OPENING POUCHES

The mechanism for opening the pouches preparatory to filling is illustrated in FIG. 4. The filling mechanism itself is not shown, for it forms no part of the present invention. It is contemplated that the pouches may be filled with any merchandise, including particulate material or solid material such as garments, the apparatus being especially useful for packaging hosiery in pouches having a window through which the hosiery can be viewed.

The opening is effected by two opposed suction cups 110 and 111 which are connected through couplings 112 to flexible hoses 113 through a valve system, not shown, to a source of vacuum. The vacuum is applied, through the valve system, in a predetermined manner so as to permit the vacuum cups to engage the front and back walls of the pouch and to pull them apart until filled by the filling mechanism. The vacuum cup 110 is mounted on leaf spring 46. The leaf spring 46 carries a cam roller 114 which rides in a cam groove 115 on cam 38. Similarly, the vacuum cup 111 is mounted on leaf spring 47 which carries a follower roller 116 which rides in the cam groove 117 (shown in phantom) in the cam 37. The cam grooves are designed so as to cause the leaf springs and the suction cups which they carry to move toward and away from each other to effect the opening of the pouch.

TOP FOLDING MECHANISM

The top folding mechanism operates similarly to the bottom folding mechanism in that the top flap 85 is folded about a blade 120 by an oscillating folder 121. The folder 121 carries a small gear 122 which meshes with a larger gear 123, both gears being rotatably mounted on a bracket 124 which is in turn mounted on the element 105 of the frame. The gear 123 is fixed to an arm 125 which is in turn connected to the upper end of a link 126, the lower end of which is pivoted to a rocker arm 127. One end of the rocker arm 127 is pivoted at 128 to a bracket 129 fixed to the frame 11. The rocker arm carries a follower roller 130 riding in a cam groove 131 of the cam 39. Rotation of the cam 39 causes the rocker arm to oscillate up and down as viewed in FIG. 5, that oscillatory motion being conveyed through the link 126, arm 125 and gear 123 to the folder 121. As the folder 121 swings from the solid line position of FIG. 5 to the broken line, it engages the top flap and folds it over the blade 120.

The outer end 133 of the rocker arm is connected by link 134 to another rocker arm 135 which is fixed to the shaft 106. The shaft 106 operates the lower flap folding mechanism as described in FIG. 3.

SEALING MECHANISM

The top and bottom flaps and the front wall of the pouch preferably have pressure sensitive adhesive applied to those surfaces which come into engagement upon folding so that no application of glue is required. Rather, it is necessary only to apply pressure to the folded flaps in order to effect sealing of the upper and lower ends of the pouch. Two pressure pads 140 and 141 are mounted on the upper end of leaf spring 48. Each pressure pad is mounted on a rod 142, the rod having a nut 143 on its opposite end and passing through a flange 144 in a bracket 145 which is fixed to the upper end of the leaf spring 48. A compression spring 146 is interposed between the pad 140 and the flange 144 to create the sealing pressure as the pads are swung into engagement with the pouch flaps. A plate 150 is fixed to the frame 11 opposite the pressure pads 140 and 141, the pouches passing between the plate 150 and the pressure pads.

The leaf spring 48 carries a follower roller 148 which rides in a cam groove 149 in the cam 41. As the cam 41 rotates, the leaf spring 48 swings in and out, carrying the pads 140 and 141 into engagement with the flaps 85 and 86, respectively. The flaps are pressed against a plate 150 and held momentarily until sealing is effected.

As viewed in FIG. 1, after sealing is effected the pouches are slid off the support 91 and dropped into a container 152 from which they are conveyed or otherwise removed for shipment.

OPERATION

In the operation of the invention, all of the principal operating elements, including the transport mechanism, are operated from the single drive shaft 30, principally by the cams and leaf springs associated therewith. The drive shaft is driven by the chain 33, and as it rotates it rotates all of the cams which are fixed to it. The rotation of the cams causes the transport bar 21 to swing through its generally oval path to engage pouches and move them intermittently step-by-step through the respective operating stations. At the feeding station 12, suction cups mounted on a cam-operated leaf spring pull pouches one at a time from a magazine into the path of transport lugs 22.

At the bottom fold station 13, the linkage driven by the cam 39 causes the bottom flap 86 to be folded upwardly.

At the opening and filling station 14, the cams 37 and 38 operating on the leaf springs 46 and 47 cause suction cups to swing toward each other to engage the pouch front and back walls and thereafter to swing apart, thereby opening the pouch to permit it to be filled by the merchandise.

At the top folding station 15, the cam 39 operating through the linkage and gear system described above causes the top flap 85 to be folded upon the pouch, thereby enclosing the merchandise.

At the sealing station 16, the leaf spring 48 operated by its cam 41 causes pressure pads to press the flaps 85 and 86 into sealing engagement with the pressure sensitive adhesive on the front wall of the pouch.

Thereafter, the pouches are slid off the support 91 and taken away for shipping.

We claim:

1. In conveyor apparatus having at least one reciprocating element, means for reciprocating said element comprising,
    a support spaced from said element,
    at least one elongated leaf spring connected at one end to said element and fixed at the other end to said support,
    a rotating cam disposed between said element and said support,
    and a cam follower interconnecting said cam and leaf spring to bend said leaf spring back and forth as said cam rotates, thereby reciprocating said element.

2. Packaging apparatus comprising,
    a plurality of reciprocating elements in a longitudinally spaced line, said elements having diverse functions associated with the conveying, opening and closing of a container,
    a longitudinally extending support spaced from said line of elements,
    a plurality of longitudinally spaced leaf springs fixed at one end to said support and operatively associated with respective elements at their other ends,
    a longitudinally extending drive shaft located between said elements and said support,
    means for rotating said shaft,
    a plurality of cams mounted on said shaft and associated with respective leaf springs,
    and followers mounted on said leaf springs and connected to said cams to swing said leaf springs back and forth to reciprocate said elements.

3. Packaging apparatus comprising,
    a plurality of reciprocating elements in a longitudinally spaced line,
    said elements including:
        a feeding element for withdrawing
        a container from a supply,
        an opening element for opening said container,
        a closing element for closing said container,
        and a conveyor element carrying a longitudinally reciprocable bar for moving containers longitudinally with respect to said elements,
    a longitudinally extending support spaced from said line of elements,
    a plurality of longitudinally spaced leaf springs fixed at one end to said support and operatively associated with respective elements at their other ends,
    a longitudinally extending drive shaft located between said elements and said support,
    means for rotating said shaft,
    a plurality of cams mounted on said shaft and associated with respective leaf springs,
    and followers mounted on said leaf springs and connected to said cams to swing said leaf springs back and forth to reciprocate said elements.

* * * * *